United States Patent
Chen et al.

(10) Patent No.: US 8,353,033 B1
(45) Date of Patent: *Jan. 8, 2013

(54) COLLECTING MALWARE SAMPLES VIA UNAUTHORIZED DOWNLOAD PROTECTION

(75) Inventors: Joseph Chen, Cupertino, CA (US); Brendon Woirhaye, Whittier, CA (US)

(73) Assignee: Symantec Corporation, Cupertino, CA (US)

( * ) Notice: Subject to any disclaimer, the term of this patent is extended or adjusted under 35 U.S.C. 154(b) by 1004 days.

This patent is subject to a terminal disclaimer.

(21) Appl. No.: 12/166,785

(22) Filed: Jul. 2, 2008

(51) Int. Cl.
*H04L 9/00* (2006.01)
(52) U.S. Cl. .................. 726/22; 726/1; 726/23; 726/24; 726/25; 726/30; 713/164; 713/167
(58) Field of Classification Search .......... 726/1, 22–25, 726/30; 713/164, 167
See application file for complete search history.

(56) References Cited

U.S. PATENT DOCUMENTS

| | | | |
|---|---|---|---|
| 5,974,549 A * | 10/1999 | Golan ............................. | 726/23 |
| 6,275,938 B1 * | 8/2001 | Bond et al. ....................... | 726/23 |
| 6,412,071 B1 * | 6/2002 | Hollander et al. ............... | 726/23 |
| 6,973,643 B2 | 12/2005 | Goldsmith et al. | |
| 7,565,686 B1 * | 7/2009 | Sobel et al. ........................ | 726/2 |
| 7,950,057 B1 * | 5/2011 | Kennedy et al. ................ | 726/22 |
| 2003/0056117 A1 * | 3/2003 | Elgressy et al. ............... | 713/201 |
| 2004/0158729 A1 * | 8/2004 | Szor ............................... | 713/200 |
| 2005/0188272 A1 * | 8/2005 | Bodorin et al. ................. | 714/38 |
| 2007/0050848 A1 * | 3/2007 | Khalid ............................. | 726/24 |
| 2007/0180524 A1 * | 8/2007 | Choi et al. ....................... | 726/23 |
| 2008/0016339 A1 * | 1/2008 | Shukla ........................... | 713/164 |
| 2008/0148399 A1 * | 6/2008 | Winkler ........................... | 726/22 |

OTHER PUBLICATIONS

Carsten Willems et al, Toward Automated Dynamic Malware Analysis Using CWSandbox, pp. 32-39, IEEE, 2007.*
Peter Ferrie, Attacks on More Virtual Machine Emulators, pp. 1-17, Symantec Advanced Threat Research, http://pferrie.tripod.com/papers/attacks2.pdf, 2007.*
Kurt Baumgartner, Storm 2007—Malware 2.0 has arrived, pp. 1-36, http://www.virusbtn.com/pdf/conference_slides/2007/BaumgartnerVB2007.pdf, 2007.*
Bhatkar, S. et al., "Address Obfuscation: An Efficient Approach to Combat a Broad Range of Memory Error Exploits," USNEIX Security Symposium, 2003, 5 pages, [Online] [Retrieved on Apr. 22, 2011] Retrieved from the Internet<URL:http://www.usenix.org/events/sec03/tech/full_papers/bhatkar/bhatkar_html/dao002.html>.
Postings of cdman83 to hype-free blog, Dec. 2006, 36 pages, [online] [Retrieved on Nov. 24, 2008] Retrieved from the Internet<URL:http://hype-free.blogspot.com/2006_12_01_archive.html>.

(Continued)

*Primary Examiner* — Philip Chea
*Assistant Examiner* — Shanto M Abedin
(74) *Attorney, Agent, or Firm* — Fenwick & West LLP

(57) ABSTRACT

A hook is set for one or more downloading functions. Subsequently, code is executed within an application process. Responsive to the executed code calling one of the hooked functions to download code, a return address of the called function is examined. If the return address is within a memory area not marked executable, the code is permitted to be downloaded and the downloaded code is submitted to a security server for analysis.

11 Claims, 4 Drawing Sheets

OTHER PUBLICATIONS

United States Office Action, U.S. Appl. No. 12/129,170, May 11, 2011, 10 pages.

U.S. Appl. No. 10/121,118, filed Apr. 10, 2002, McCorkendale et al.

Winter-Smith, P., "Exploitation of Buffer Overflow Vulnerabilities Under Windows XP", Hitchhiker's World, Issue #8, 27 pages, [online] [Retrieved on Nov. 19, 2008] Retrieved from the Internet <URL:http://www.infosecwriters.com/hhworld/hh8/WideChapter.txt>.

"X-Force Research & Development Newsletter," X-Force Newsletter, Internet Security Systems, Inc., Oct. 2006, 7 pages.

* cited by examiner

COLLECTING MALWARE SAMPLES VIA UNAUTHORIZED DOWNLOAD PROTECTION

CROSS REFERENCE TO RELATED APPLICATIONS

The application is related to application Ser. No. 12/129,170, filed on May 29, 2008.

BACKGROUND OF THE INVENTION

1. Field of the Invention

This invention pertains in general to computer security and in particular to collection of malware samples through detection of unauthorized downloads.

2. Description of the Related Art

Modern computer systems are often susceptible to a number of different problems, problems which are exacerbated by the increasing complexity of computer systems. One such problem relates to system security. There exists a wide variety of security threats posed by malicious software—collectively referred to as "malware"—that secretly performs operations not desired by the computer user. Such operations include theft of important data (e.g. financial records), modification or destruction of system or user files, execution of "backdoor" programs, and downloading of other malicious executable files.

Unfortunately, malware proves difficult to detect. Although signatures may be formulated for a given instance of malware and then distributed to security software packages to aid in malware recognition, there may be a long time period—known as a vulnerability window—between the first executions of a given instance of malware and the distribution of signatures. The first time that a new instance of malware executes, it will not yet be known to be malware and thus no signatures will yet be available for it. Thus, in many cases, the malware will install itself and infect a number of systems before users detect any abnormal system behavior caused by it and submit it to a security software provider (e.g., a provider of anti-malware software solutions) for analysis. By the time that the security provider analyzes the malware, derives signatures used to identify the malware, and makes the signatures available to security software, much harm may already have taken place. It is possible for security software providers to proactively seek new instances of malware for analysis in order to reduce the vulnerability window, but it may prove difficult for security software providers to locate sources of malware distribution.

BRIEF SUMMARY

The difficulties described above are addressed by a computer, method, and computer program product that examine return addresses of functions known to be used in malware exploits to determine whether the calling code poses a security risk. If so, data being downloaded by the code is submitted to a security server for analysis. Such an approach examines general behavior of common malware distribution mechanisms, and thereby not only prevents malware installation and/or execution, but also provides to security software providers an effective way of obtaining samples of potential malware. These malware samples can then be analyzed and signatures derived within a short time of the initial introduction of the malware, thus shortening the vulnerability window. The signatures subsequently allow detection of the malware, even if it arrives via different types of malware distribution mechanisms than the ones addressed herein.

One embodiment of the method hooks one or more downloading functions that can be called by code executing on the computer to download data. Responsive to a hooked downloading function being called, a return address of code executing on the computer that called the hooked downloading function is identified. Responsive to determining that the return address is within a memory area marked executable, the called downloading function is permitted to download data, and the downloaded data is submitted to a security server.

Embodiments of the computer-readable storage medium have executable computer program logic embodied therein for capturing data for analysis by a security server. The computer program logic comprises hooking one or more downloading functions that can be called by code executing on the computer to download data. The compute program logic further comprises identifying a return address of code executing on the computer that called the hooked downloading function responsive to a hooked downloading function being called, and determining whether the code corresponding to the return address is in a memory area marked executable. Responsive to determining that the return address is within a memory area marked executable, the called downloading function is permitted to download data, and the downloaded data is submitted to a security server A computer adapted to capture data for analysis by a security server, comprises a computer readable storage medium storing executable computer program modules. The computer program modules comprise a hooking module for hooking one or more downloading functions that can be called by code executing on the computer to download data. The modules further comprise a code checking module for identifying a return address of code executing on the computer that called the hooked downloading function, responsive to a hooked downloading function being called, and determining whether the code corresponding to the return address is in a memory area marked executable. The modules further comprise a response module that—responsive to the code checking module determining that the return address is not within a memory area marked executable—permits downloading of data by the called downloading function, and submits the downloaded data to a security server.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
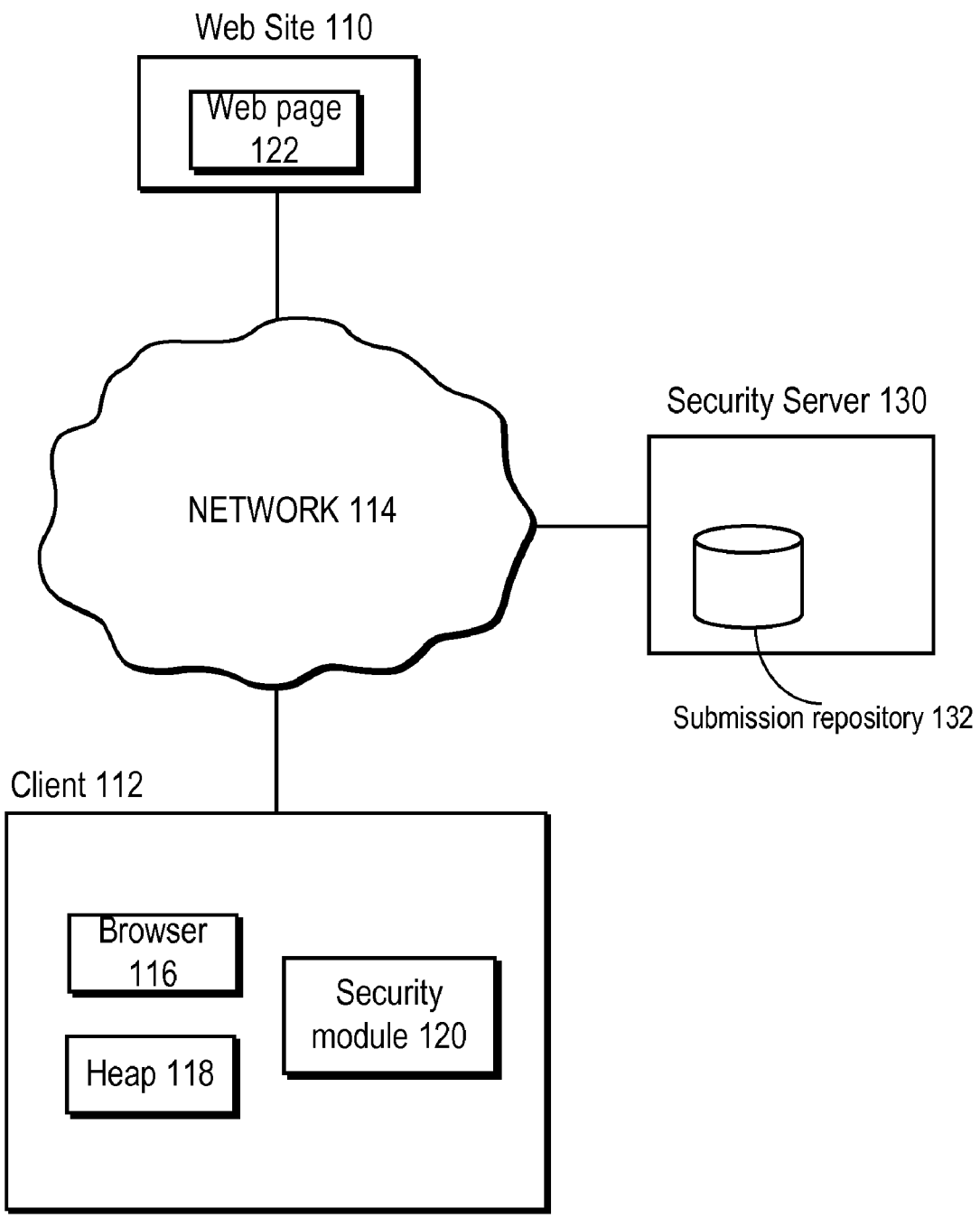
FIG. 1 is a high-level block diagram of a computing environment according to one embodiment.

FIG. 1 is a high-level block diagram of a computing environment 100 according to one embodiment. FIG. 1 illustrates a web site 110 and a client 112 connected by a network 114. Only one client 112, one web site 110, and one security server 130 are shown in FIG. 1 in order to simplify and clarify the description. Embodiments of the computing environment 100 can have thousands or millions of clients 112, web sites 110, and/or security servers 130 connected to the network 114.

In one embodiment, a client 112 is a computer used by one or more users to perform activities including browsing web sites 110 on the network 114. The client 112 executes a web browser 116 such as MICROSOFT INTERNET EXPLORER or MOZILLA FIREFOX that allows the user to retrieve and display content from web sites 110 and other computers on the network 114. In other embodiments, the client 112 is a network-capable device other than a computer, such as a personal digital assistant (PDA), a mobile telephone, a pager, a television "set-top box," etc.

The client 112 includes a heap 118. The heap 118 is a memory area that is dynamically allocated to store data for applications executing on the client 112. In one embodiment, the browser 116 uses the heap to store data. In addition, the client 112 includes a security module 120 for monitoring and protecting the client 112. If the security module 120 detects an attempt to attack the client 112 by downloading potential malware, it can capture the potential malware and submit it to the security server 130 for analysis. It can also perform additional remediating actions, such as preventing installation or execution of the potential malware or notifying a user.

The web site 110 includes a collection of one or more web pages 122 stored on a web server. The web site 110 is identified by its uniform resource locator (URL). The client 112 uses the URL to download a web page 122 from the site 110 via the network 114.

Assume for purposes of this discussion that the web site 110 is operated by a malicious entity and surreptitiously serves malicious software ("malware"). The web site 110 can be, for example, a legitimate web site that has been compromised by a malicious actor and reconfigured to distribute malware. Alternatively, the web site 110 can be directly operated by a malicious entity but designed to appear legitimate.

The web site 110 distributes the malware by providing a web page 122 that exploits a vulnerability on the client 112 to compromise the client. Since the web page 122 has a size not known a priori, the web browser 116 or other application accessing the web page 122 dynamically allocates memory for it within the heap 118. In one embodiment, the web page 122 includes code, such as JAVASCRIPT code, that "sprays" the heap 118 or another memory area in the client 112 with malicious code by making multiple copies of the code at different locations in the memory area. For example, the code in the web page can allocate a large block of memory, such as an array, within the heap 118 and then cause the client 112 to store specially-crafted content containing malicious instructions therein. Sometimes, the content takes the form of extremely long strings or large images. Portions of the content stored in the heap contain computer-executable instructions for downloading additional malware to the client 112.

After spraying the heap 118, the code in the web page 122 exploits a vulnerability at the client 112 that causes the malicious code sprayed into the heap 118 or other memory area to execute. For example, the code in the web page 122 can exploit a buffer overflow vulnerability in the client's web browser 116, which causes function pointers to be overwritten with the value of an address located in the heap. Since the downloading code has been sprayed throughout the heap 118, there is a high probability that the heap address written into the function pointers will reference the starting address of the downloading code, which will then execute and download additional malware.

In one embodiment, the security module 120 detects when code executing in the heap 118 or other area of non-executable memory attempts to download data, a function known as "unauthorized download protection." In response, the security module 120 allows the download to occur but captures the downloaded data and submits it to the security server 130 for analysis. Accordingly, the security module 120 not only protects the client 112 from a heap-spraying based attack attempting to install or execute potential malware, but also captures the potential malware for analysis.

In one embodiment, the security server 130 is a computer used by a security software provider to receive data related to malware via the network 114. It can contain a submission repository 132 such as a file or a relational database, which stores the data constituting potential malware that is submitted by the security module 120 of the client 112. The data in the submission repository 132 can then be analyzed, either by the security server 130 or by other systems, to determine whether it is indeed malware. If so, malware signatures can be derived, stored, and incorporated into existing security modules, e.g. by distribution over the network 114.

The network 114 represents the communication pathways between the web site 110, the client 112, and the security server 130. In one embodiment, the network 114 is the Internet and uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
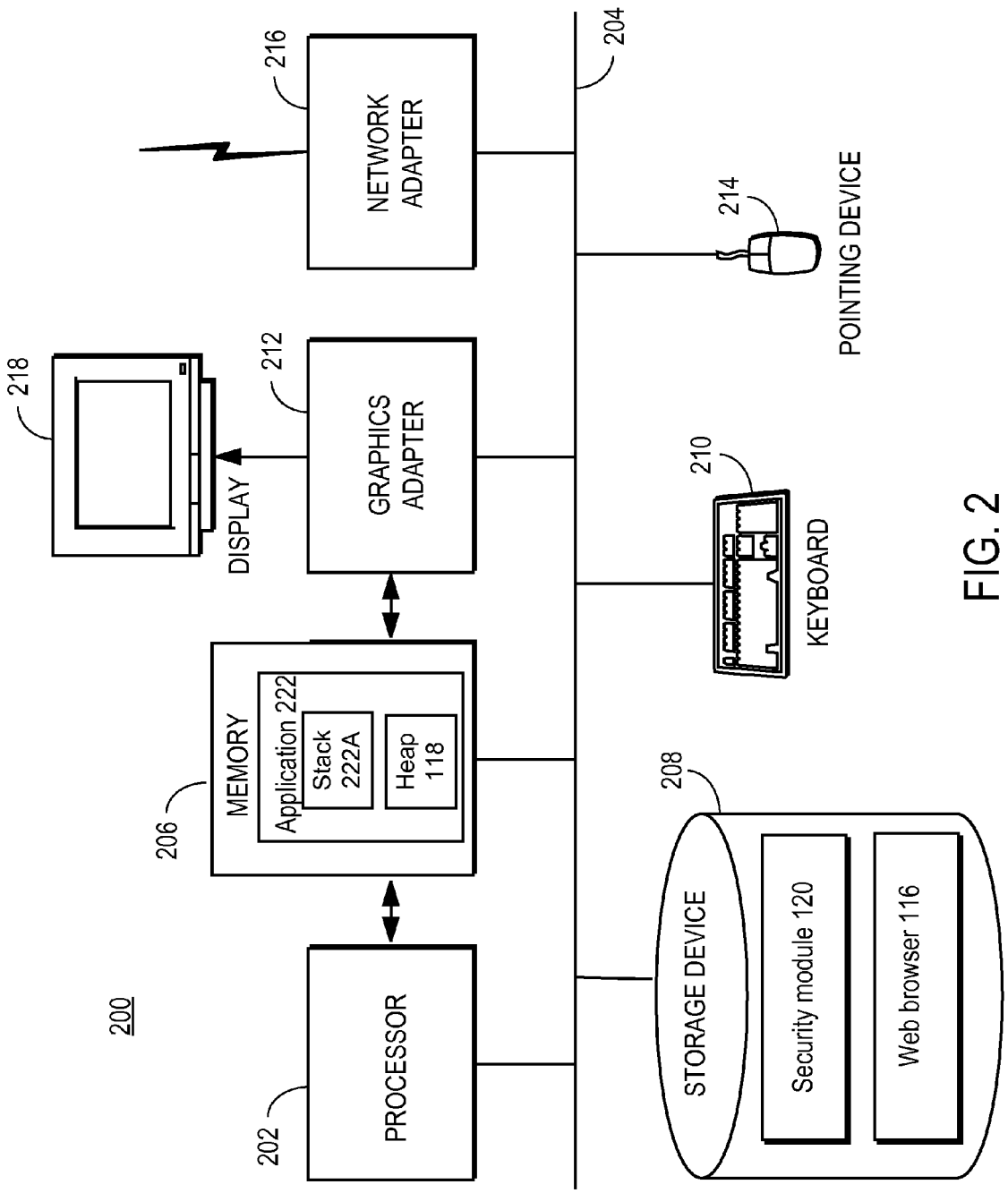
FIG. 2 is a high-level block diagram illustrating a typical computer according to one embodiment.

FIG. 2 is a high-level block diagram illustrating more detailed view of the client 112 or security server 130 (FIG. 1) according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

The memory 206 may be, for example, firmware, read-only memory (ROM), non-volatile random access memory (NVRAM), and/or RAM, and holds instructions and data used by the processor 202. The memory 206 may be divided into pages by the operating system, each page having attributes such as whether the page is readable, writable, or executable (i.e. contains executable instructions), or whether it was loaded from a file on the storage device 208. In one embodiment, the memory 206 includes RAM that holds instructions and data used by the client 112.

FIG. 2 depicts an in-memory application 222—such as the web browser 116 (FIG. 1)—that comprises, among other portions, a stack 222A and a heap 118. The stack 222A stores data in a last-in, first-out manner, and is appropriate for tasks such as maintaining the call stack of the application 222. As noted above, the heap 118 is a region of free memory that is allocated dynamically while the application 222 is being executed. For example, the browser 116 stores web pages, scripts associated with web pages, objects for parsing the web pages, etc., within the heap 118, given that the precise size and number of such objects is not known until runtime and must therefore be assigned dynamically. Note that the heap 118 is not intended to store executable code and thus memory pages corresponding to the heap specify that the pages are not executable. As such, a function call originating from within the heap 118 is an anomalous condition.

The storage device 208 is, in one embodiment, a hard disk drive but can also be any other device capable of storing data, such as a writeable compact disk (CD) or DVD, a solid-state memory device, or other form of computer-readable storage medium. The storage device 208 stores files and other data structures used by the computer. The web browser 116 and security module 120 are illustrated within the storage device 208.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

In addition, this description uses the term "application" to refer to a program executed by the computer 200. Applications include programs such as word processors, web browsers, browser plug-ins and browser helper objects, multimedia editors, email clients, and the like. For purposes of example, the remainder of the discussion below focuses on an embodiment where the application is a web browser 116. However, the application can differ in different embodiments.

Figure 3:
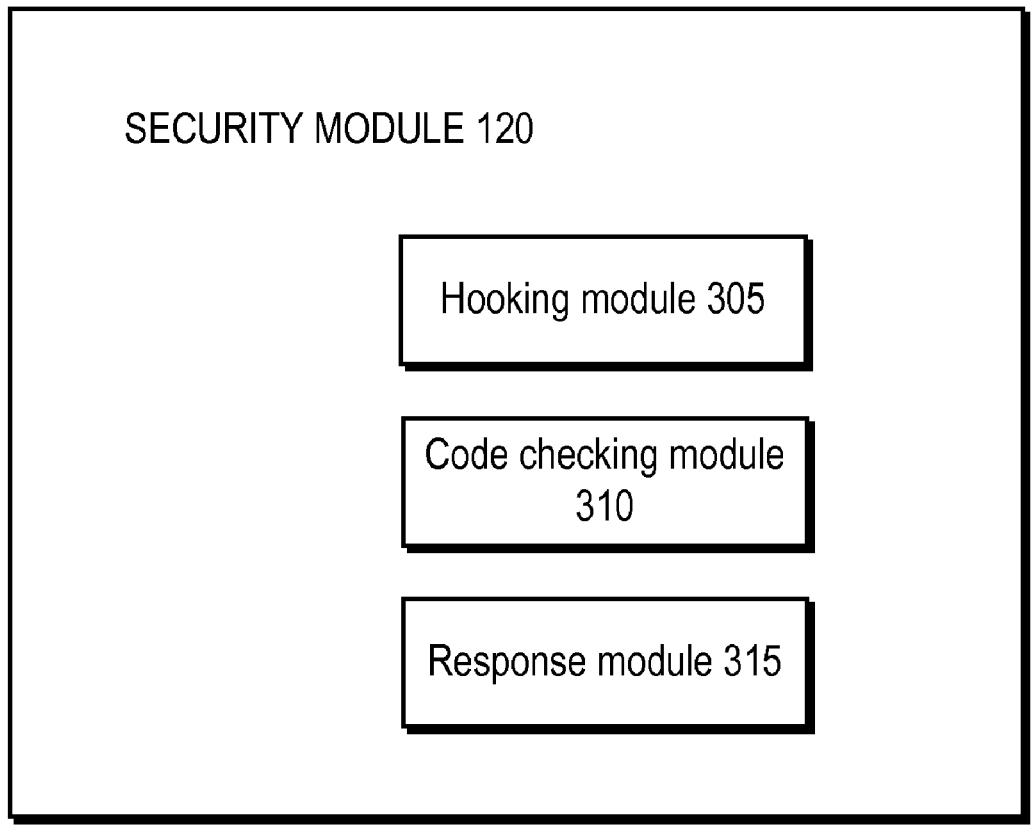
FIG. 3 is a high-level block diagram illustrating a detailed view of the security module of FIG. 1, according to one embodiment.

FIG. 3 is a high-level block diagram illustrating a detailed view of the security module 120 (FIG. 1) according to one embodiment. Generally, an embodiment of the security module 120 hooks one or more downloading function calls known to be used by malware to perform surreptitious downloads. If a downloading function is called from code executing on the heap 118, the security module 120 recognizes that this function call represents an attempt to compromise the client and performs remediation.

A hooking module 305 hooks function calls likely to be used during an exploit to download malicious software to the client 112 (FIG. 1). In practice, most malware accomplishes the downloading of the malicious executable using one of a small set of well-known data downloading function calls. For example, on the WINDOWS platform, the malicious code typically uses one of the functions UrlDownloadToFileA, UrlDownloadToFileW, UrlDownloadToCacheFileA, or UrlDownloadToCacheFileW, all of which download data from a given uniform resource locator (URL), storing the data either in a file or in an Internet cache location of the browser application 116. Execution of the function causes the address of the calling code to be pushed onto the stack 222A. Following the execution of the data downloading function, the address of the calling code is found on the stack 222A, and control is returned to that address, which in this case is the address of the malicious downloading code allocated on the heap. In one embodiment, the hooking module 305 sets hooks for these data downloading functions when the security module 120 is first activated (e.g., at boot time for the client 112). These hooks cause the security module 120 to activate whenever one of these data downloading functions is called. At this point, the security module 120 can allow the call to proceed normally, or can take a special action.

A code-checking module 310 executes when a hooked function is called and determines whether the hooked function was called by code executing on the heap 118 (FIG. 1). In one embodiment, the code-checking module 310 identifies the return address of the hooked function by examining the stack 222A and then determines whether this address is on the heap 118. In one embodiment, the code-checking module 310 determines that the address is on the heap 118 if either the page of memory corresponding to the return address does not have an "executable" attribute set, or the page data was not loaded from a file on the storage device 208. If the return address stored on the stack 222A is not within the heap 118, then the code checking module 310 exits and allows the function call to proceed normally. If the return address is within the heap 118, then this is evidence that an attack on a client 112 is underway because such functions should not be called from the heap 118.

A response module 315 responds to detection of a potential attack by the code-checking module 310. One action performed by the response module 315 is to capture the data downloaded by the data downloading function and prevent it from being installed or executed, given that the data likely constitutes malware. A subsequent, related action performed by an embodiment of the response module 315 is to submit the captured data to the security server 130 (FIG. 1) for analysis. In one embodiment, the response module 315 submits the captured data to the security server 130 via the network 114 using conventional network protocols. In one embodiment, all of the captured data are submitted; in other embodiments, only portions of the captured data deemed relevant are submitted. The response module 315 may perform additional actions in different embodiments. For example, in one embodiment, the response module 315 returns a result code to the caller. This result code can indicate, for example, that the function call failed or that the call was successful. The response module 315 can also perform actions such as terminating the browser, providing an error message to the user and/or an administrator, logging the attack, etc. In a further embodiment, the action may include any or all of these, the precise actions taken being specified via a user policy, e.g. via a preferences setting in software embodying the security module 120.

The particular apportionment of the functionality of the security module 120 can be differently divided among modules in other embodiments. For example, the functionality of the code checking module 310 and the response module 315 might be implemented within a single module.

Figure 4:
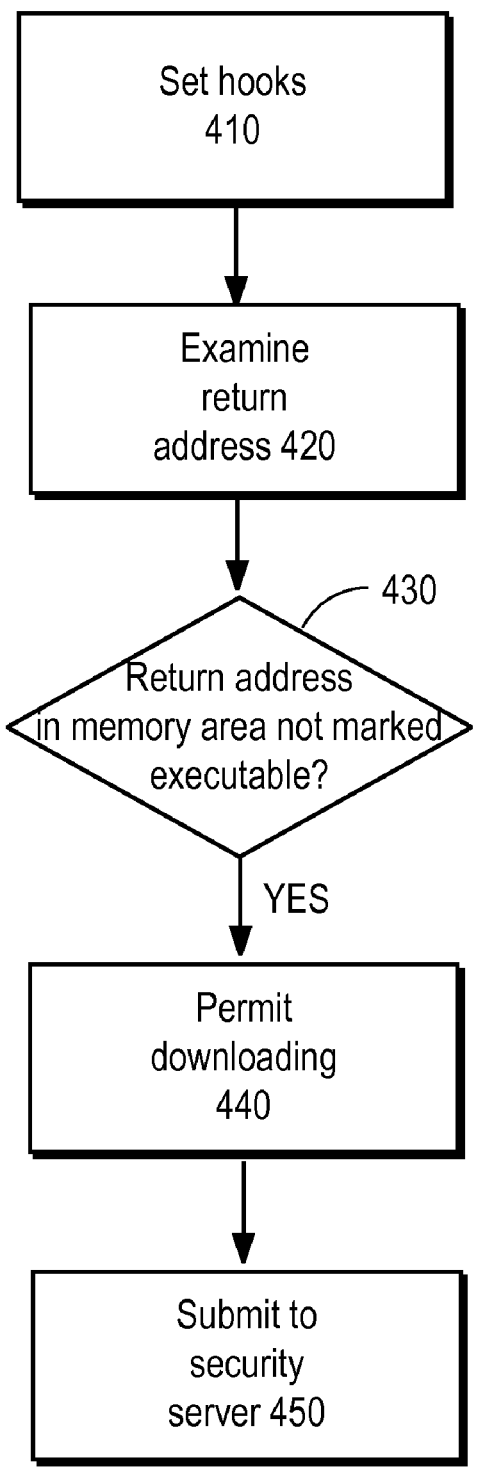
FIG. 4 is a flowchart illustrating steps for using the security module to detect and respond to browser-based malware, according to one embodiment.

FIG. 4 is a flowchart illustrating steps for using the security module to detect and respond to malware attacks, according to one embodiment. At step 410, the hooking module 305 (FIG. 3) hooks the data downloading functions known to be commonly used by malicious browser-based code, such as functions to download files from a given URL. Specifically, the hooking module 305 sets hooks to cause the code checking module 310 to activate if the functions are called. In one embodiment, such hooking is performed at the time that the security module 120 (FIG. 1) is first executed, e.g. at system startup of the computer 200.

At step 420, assume that one of the hooked functions is called. As a result, control transfers to the code-checking module 310 (FIG. 3). This module 310 proceeds to examine the return address of the caller, to which control would normally return after the completion of the hooked function.

At step 430, the code-checking module 310 branches based on the value of the return address. If the return address specifies a location of memory that is marked executable, then the code-checking module 310 transfers control back to the well-known function. If, however, the return address specifies a location of memory that is not marked executable, such as memory within the heap 222A, then the calling code is deemed to be potentially malicious.

If the code is deemed to be potentially malicious, the method proceeds to step 440, in which the response module 315 (FIG. 3) takes actions to address the potential malware, such as returning an error code, terminating the web browser 116, and/or displaying a message, thereby preventing the malicious code from causing harm. It also submits 450 the potential malware to the security server 130 (FIG. 1) for analysis. The security server 130 then may store the potential malware in the submission repository 132 for subsequent analysis. The analysis may be performed by authorized users of the security server 130, such as computer security analysts, or may be performed directly by the security server 130 itself. If the analysis verifies that the potential malware is in fact actual malware, then signatures are derived from the malware, stored, and made available for use by security software.

Note that this approach focuses on the behavior of the code used to install or execute malware, such as heap code calling a function downloading a file. Thus, all malware installed or executed by code having this same general behavior—in practice, a large class—can be captured soon after its introduction, without the need for prior knowledge of the malware. This capturing in turn allows for the derivation of signatures used by other client systems to detect malware, even if the malware arrives in a different manner. For example, once the signatures are derived for a given type of malware, that malware can be detected even if it enters the system via some security vulnerability other than that detected by the above-described unauthorized download protection.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of capturing data on a client computer for submission to a security server, the method comprising:
hooking, by the computer, one or more downloading functions that can be called by code executing on the computer to download data via a network;
responsive to a hooked downloading function being called, identifying, by the computer, a return address of code that called the hooked downloading function, the code executing on the computer in a web browser process;
determining, by the computer, whether the code corresponding to the return address is in a heap memory area of the browser process;
responsive to the return address being within the heap memory area of the browser process, the computer:
permitting downloading of data from a remote computer via the network by the downloading function called by the code;
preventing further execution of the code; and
submitting the downloaded data to a remote security server via the network for analysis at the remote security server; and
responsive to the return address not being within a memory area marked executable, the computer:
consulting a user-specified policy to determine an action to take; and
responsive to consulting the policy, performing at least one of returning an error code and displaying an alert.

2. The method of claim 1, wherein the hooked downloading functions include a function from the group of UrlDownloadToFileA, UrlDownloadToFileW, UrlDownloadToCacheFileA, and UrlDownloadToCacheFileW.

3. The method of claim 1, further comprising denying, by the computer, execution of the downloaded data responsive to the return address being within the heap memory area of the browser process.

4. A non-transitory computer-readable storage medium having executable computer program logic embodied therein for capturing data on a client computer for submission to a security server, the computer program logic performing actions comprising:
hooking one or more downloading functions that can be called by code executing on the computer to download data via a network;
responsive to a hooked downloading function being called, identifying a return address of code that computer that called the hooked downloading function, the code executing on the computer in a web browser process;
determining whether the code corresponding to the return address is in a heap memory area of the browser process;
responsive to the return address being within the heap memory area of the browser process, the computer:
permitting downloading of data from a remote computer via a network by the downloading function called by the code;
preventing further execution of the code; and
submitting the downloaded data to a remote security server via the network for analysis at the remote security server; and
responsive to the return address not being within a memory area marked executable, the computer:
consulting a user-specified policy to determine an action to take; and
responsive to consulting the policy, performing at least one of returning an error code and displaying an alert.

5. The computer-readable storage medium of claim 4, wherein the hooked downloading functions include a function from the group of UrlDownloadToFileA, UrlDownloadToFileW, UrlDownloadToCacheFileA, and UrlDownloadToCacheFileW.

6. The computer-readable storage medium of claim 4, wherein the code is downloaded over the network.

7. The computer-readable storage medium of claim 4, the computer program logic further comprising denying execution of the downloaded data responsive to the return address being within the heap memory area of the browser process.

8. A computer adapted to capture data for submission to a security server, the computer comprising:
a non-transitory computer-readable storage medium storing executable computer program modules comprising:
a hooking module for hooking one or more downloading functions that can be called by code executing on the computer to download data via a network;
a code checking module for:
identifying a return address of code that called the hooked downloading function, responsive to a hooked downloading function being called, the code executing on the computer in a web browser process, and
determining whether the code corresponding to the return address is in a heap memory area of the browser process; and a response module for:

performing actions comprising the following, responsive to the code checking module determining that the return address is within the heap memory area of the browser process;

permitting downloading of data from a remote computer via a network by the downloading function called by the code;

preventing further execution of the code; and submitting the downloaded data to a remote security server via the network for analysis at the remote security server; and performing actions comprising the following, responsive to the code checking module determining that the return address is not within a memory area marked executable:

consulting a user-specified policy to determine an action to take; and responsive to consulting the policy, performing at least one of returning an error code and displaying an alert.

9. The computer of claim 8, wherein the hooked downloading functions include a function from the group of UrlDownloadToFileA, UrlDownloadToFileW, UrlDownloadToCacheFileA, and UrlDownloadToCacheFileW.

10. The computer of claim 8, wherein the code is downloaded over the network.

11. The computer of claim 8, the actions of the response module further comprising denying execution of the downloaded data responsive to the return address being within the heap memory area of the browser process.

\* \* \* \* \*

UNITED STATES PATENT AND TRADEMARK OFFICE
CERTIFICATE OF CORRECTION

PATENT NO. : 8,353,033 B1
APPLICATION NO. : 12/166785
DATED : January 8, 2013
INVENTOR(S) : Joseph Huaning Chen and Brendon Woirhaye Page 1 of 1

It is certified that error appears in the above-identified patent and that said Letters Patent is hereby corrected as shown below:

In the Claims

Column 8, line 20, Claim 4; after "code", remove "that computer"

Signed and Sealed this
Twenty-seventh Day of August, 2013

Teresa Stanek Rea
*Acting Director of the United States Patent and Trademark Office*